Nov. 12, 1946.  G. E. FREDERICKS ET AL  2,411,089
ELECTROLYTIC TYPE OF PERIODIC CIRCUIT INTERRUPTER
Filed Feb. 1, 1946   3 Sheets-Sheet 1
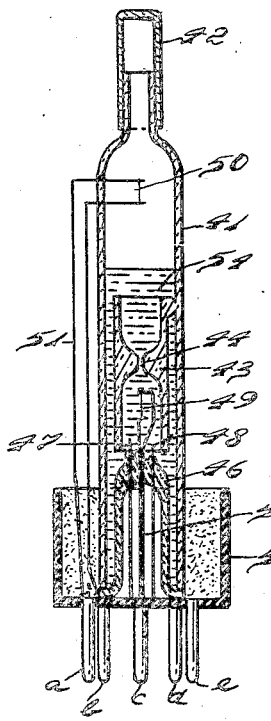
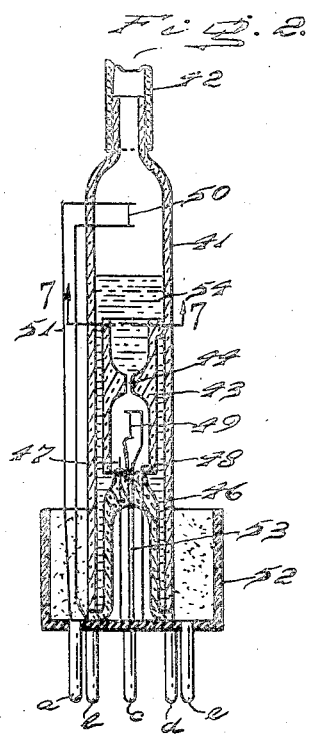
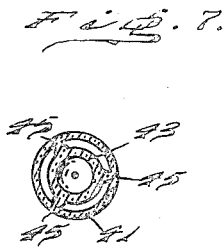
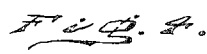
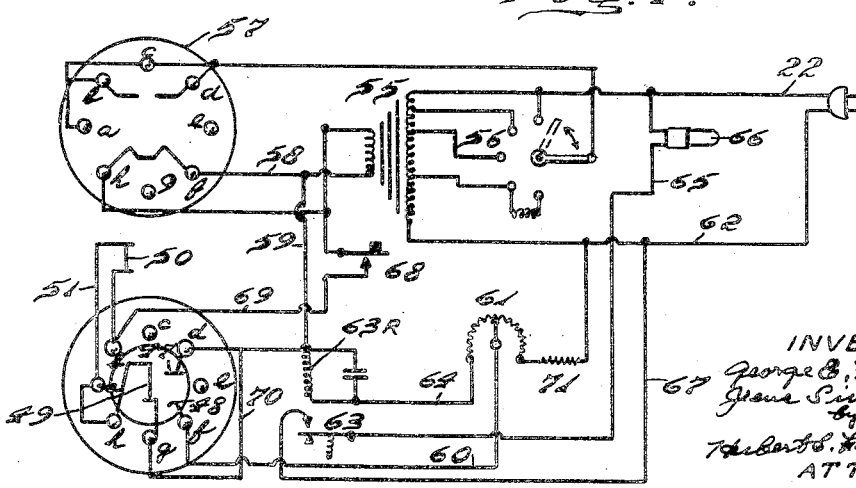
INVENTORS
George E. Fredericks
Gene Sivertsen
by
Hubert S. Fairbanks
ATTORNEY.

Nov. 12, 1946.    G. E. FREDERICKS ET AL    2,411,089
ELECTROLYTIC TYPE OF PERIODIC CIRCUIT INTERRUPTER
Filed Feb. 1, 1946    3 Sheets-Sheet 2

INVENTORS.
George E. Fredericks
Jens Sivertsen
by
Herbert J. Fairbanks
ATTORNEY.

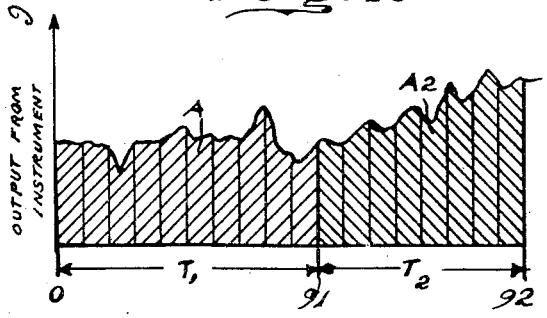

Patented Nov. 12, 1946

2,411,089

UNITED STATES PATENT OFFICE 2,411,089

ELECTROLYTIC TYPE OF PERIODIC CIRCUIT INTERRUPTER

George E. Fredericks, Bethayres, and Jens Sivertsen, Philadelphia, Pa., assignors to George E. Fredericks Co., Bethayres, Pa., a corporation of Pennsylvania Application February 1, 1946, Serial No. 644,878

10 Claims. (Cl. 175—320)

In industrial applications, it is often desirable for an operation to continue for a limited time and then stop. In some cases, it is desirable to have a manual control to start the operation, and, in other cases, it is desirable to have the operation automatically restarting, the latter being usually defined as an automatic recycling.

The method and apparatus herein disclosed is suitable for both types of operations. This does not hold true of thermal types of time delayed relays which are not well suited for immediate recycling.

A further advantage in the present method is that a linear scale can be obtained which is of major interest in many automatic applications where only a small power can be used and particularly in vacuum powered circuits.

The accuracy obtainable is excellent due to the fact that the system is based on a simple natural law, and the parts can be readily manufactured to desired tolerances. Where even higher accuracy is required, individual adjustments can be readily made due to the linear scale calibration.

The instrument is primarily an integrator. For example, if we have a varying voltage E, we will have at all times a current $$I = \frac{E}{R}$$

where R is the resistance of the circuit. The instrument will sum up the value $$\int_0^T \frac{E}{R} dt = K$$

K is constant, while T may vary from one cycle to another. After K has been obtained, the process may be automatically restarted, or is automatically interrupted and restarted manually.

If instead of the voltage varying, the current varies, we obtain a voltage drop $Ir$ by passing the current over a resistor $r$ and thereby obtain $$\int_0^T I dt = K.$$

If the current is small enough, we can use it directly in the circuit without any drop resistor $r$, or, if either the current or the voltage is too small, we can use an amplifier tube to obtain the proper value. In this manner, the instrument can be used as an integrator or timer in many automatic controlling devices.

In carrying out the invention in practice, an electric current is passed through an electrolyte to convert a portion of it into its component gases, the gases are exploded to complete a cycle and the time interval of the cycle is utilized to time any desired operation.

With the foregoing and many other objects in view as will hereinafter more clearly appear our invention comprehends a novel method of integrating, a novel method of timing, and a novel electrolytic integrator and timer.

For the purpose of illustrating the invention, we have shown in the accompanying drawings preferred embodiments of it which we have found in practice to give satisfactory and reliable results. It is, however, to be understood that the various instrumentalities of which the invention consists can be variously arranged and organized and the invention is not limited to the exact arrangement and organization of these instrumentalities as herein set forth.

Figure 1 is a sectional elevation of an electrolytic integrator and timer and illustrative of one manner of practicing the invention. The electrolytic levels show the beginning of a cycle.

Figure 2 is a sectional elevation similar to Figure 1 but showing the electrolytic levels as at the end of the cycle.

Figure 3 is a bottom plan view of Figure 1, showing the electrodes and filaments diagrammatically with the pin connections.

Figure 4 is a wiring diagram.

Figure 7 is a section on line 7—7 of Figure 2.

Figures 8 and 9 are electrical circuit diagrams for timing and integrating operations.

Figure 10 is a graph showing integration.

Similar numerals of reference indicate corresponding parts.

Figure 5:
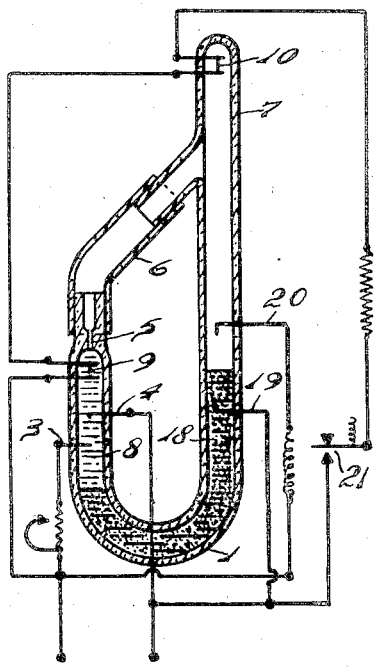
Figure 5 is a sectional elevation of another embodiment of the invention in which mercury is used with the electrolyte for contact purposes.
Figure 6:
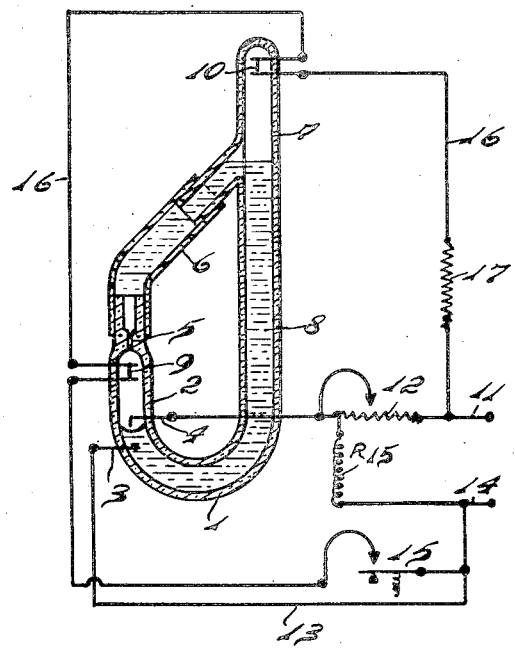
Figure 6 is a sectional elevation of another embodiment of the invention which is similar to that of Figures 1 and 2 except that the chambers are of a different physical form.

Referring to the drawings:

For the purpose of explaining the principle of the invention, we will first consider Figure 6 in which a tube 1 is in the form of a U tube having in its short leg 2 electrodes 3 and 4. The short leg 2 is nearly closed at its upper end by a stricture 5 and a tube 6 leads therefrom into the upper end of a long leg 7 of the tube, thereby forming intercommunicating chambers, it being understood that the receptacle formed by the tube 1 may have many different forms. The tube 1 is filled with an electrolyte 8 which may be a weak solution of sulfuric acid or other suitable acid or base. A heater 9 is within the tube 1 and as shown in the leg 2 above the electrodes 3 and 4, and a heater 10 is preferably employed in the leg 7 above the electrolyte.

In the electric circuit in Figure 6, the current passes from a source of electric supply by a lead 11 through a variable resistance 12 to the electrode 4, electrode 3 and by line 13 to lead 14. A relay 15 in a heater line 16 is connected to the leads and heaters 9 and 10. The heater line is preferably provided with a fixed resistance 17.

A small current is passed between the electrodes 3 and 4, which, if we use sulfuric acid as an electrolyte, causes a small amount of oxygen and hydrogen at the electrodes. The gases rise and are trapped below the stricture 5. Enough of the electrolyte adheres to the top wall of the chamber to completely close the stricture by capillary action. The trapped gases create a pressure above the electrolyte forcing the liquid level downwardly, thereby opening the electrode circuit. The voltage across the electrodes is small, two to eight volts depending on the electrolyte used. $Ee=E-IR$, where I is the electrode current and R the resistance of that part of resistor 12 in series with the electrodes. The voltage across the relay coil has therefore been kept low due to the drop IR, and this voltage has been insufficient to deliver enough current to the relay coil $R_{15}$ to energize it. When the electrolytic current ceases, the relay receives sufficient power to attract its armature.

The current now passes through heaters 9 and 10, and the gases are exploded. The space previously occupied by the gases is reoccupied by the electrolyte. The relay automatically recycles the instrument.

During the explosion, a rather high pressure obtains in the gas chamber which but for the stricture might force some of the mixture which is unexploded down through the liquid. The stricture opens under this high pressure and allows this gas to escape through the stricture into the upper chamber in which the water vapor and gas mixture separate slowly.

By the next time the heating of the filament occurs, we may get a slight explosion of these escape gases around the filament 10. This explosion, however, is almost imperceivable and is rarely seen due to the fact that almost all of the gases are exploded in the short leg of the tube.

In the embodiment seen in Figure 5, the tube, electrodes and heaters are the same as in Figure 6, the main difference being that mercury 18 is used with the electrolyte to control contacts 19 and 20 for the relay 21, whereas in Figure 6 an electromagnetic relay is used. The electrolytic circuit and the heater circuit will therefore be clear without detailed description.

In Figures 1 to 4 and 7, the integrator and timer has been shown in a different form but embodying the same principles as in Fig. 6. An outer tube 41 is sealed at its upper end by a cap 42. An inner, open ended tube 43 has a stricture 44 and is connected at three points 45 with the wall of the outer tube to be suspended within it, see Fig. 10. Within, spaced from and sealed with the outer tube is a press 46 supporting spaced electrodes 47 and 48 embedded in insulating material except at their upper ends which extend into the lower chamber of the inner tube 43. A heater 49 is positioned in the lower chamber above the electrodes and its line is in the press. A heater 50 having a line 51 is in the upper chamber of tube 41. The tube structure is sealed in a base 52 of insulating material. The base has prongs $a$, $b$, $c$, $d$, $e$, $f$, and $g$ and $h$. Prongs $a$ and $b$ are in the heater line 51; $h$ and $g$ in heater line 53; and $d$ and $f$ in the electrode line. 54 is the electrolyte.

In the diagram, Fig. 4, current passes by line 22 to the primary of a transformer 55 and from a selected tap 56 of the primary to the plates or anodes of a rectifier tube 57, and by line 58 from the secondary to the heater of tube 57. The rectified current passes by line 59 to the electrodes and by line 60 and rheostat 61 to line 62. The gases formed from the electrolyte cause the level of the electrolyte to lower and open the circuit through the electrodes. When this electrode current is broken, the current through the relay coil 63R increases to energize the relay and 63 gives contact for a current to pass by lines 22 and 65, lighting a lamp 66, to relay 63, line 67 and line 62. The lighting of the lamp indicates that the instrument is ready for recycling. To repeat the cycle, the operator closes a momentary push button switch 68 and current passes by line 69 through the heaters, returning by lines 70 and 59 to the secondary. If the contacts of switch 68 had been arranged on the relay, recycling would have automatically occurred.

In Figure 8 a circuit diagram is shown for utilizing the instrument as an integrator with the embodiment seen in Figures 1 and 2. 72 is a transformer to obtain correct filament voltage for a rectifier tube 73. The circuit whereby a rectified pulsating D. C. current is obtained from the A. C. supply is conventional and similar to that already described. By means of condensers 73 and 74 and resistors 75 and 76 we obtain from point 77 to 78 across 76 a partly smoothed D. C. voltage and get a current from 77 across resistor 79 and part of 80 a current which in 80 is divided into two parts, namely, I which is the electrolysis current to anode 47 and cathode 48 and to 78; and a small current $i$ which is continuous through all of resistor 80 and relay coil 81 to 78. The voltage required across the electrodes 47 to 48 is a nearly constant voltage, not dependent on current. If we wish to evaluate the path in ohms, we have, maybe, four volts and a current of 20 ma., i. e. the path represents 200 ohms. The relay coil 81 may have a resistance of 10,000 ohms. The current $i$ will therefore be only $4/10{,}000$ A. which is entirely insufficient to energize the relay. The electrode current will depend on the position of an arm 83 which moves a pointer 84 to different positions on 80. The current can therefore be varied between a maximum value which we have when the pointer is near 79 and a minimum value determined by the limit of the stroke of the arm 83. The arm 83 is energized by any instrument, recorder or motor affected by the quantity we want to integrate, for example, a liquid flow, a gas flow, or a gas or liquid pressure that varies.

If it is an electric flow, we can use a simpler arrangement as previously explained. The current will be directly inversely proportional to the sum part of the resistors 80 and 79 in series with the electrodes 47 and 48.

When the electrode current is broken by the liquid level as previously explained, the voltage drop in resistors 79 and 80 disappears, and the small current $i$ increases to a value sufficient to energize the relay. This may be 1, 2, 5 or 10 ma. dependent on the characteristic and quality of relay selected dependent on the accuracy required.

When the relay is energized, two things will happen:

A. A current will pass from 85 over the relay contacts 86 and 87 through the electric counter coil 88 and to 78 which is minus. The counter 89 will move ahead one number.

B. A current will pass from 113 which is one side of the winding of the filament transformer over the relay contacts 86, 87, through the filaments 49 and 50 and back to the other side 90 of the filament winding.

The gas mixture explodes as previously explained, recycling the process which starts over again while one unit has been counted by the electric counter. One unit is equal to one product of flow and time, i. e., volume or whatever else was integrated.

Figure 10 shows a diagram of the integration. From 0 to 91 is one integration which resulted in the counter stepping ahead one number; and from 91 to 92 is the next integration and the counter steps ahead an additional number.

The time $T_1$ is not equal to the time $T_2$, however, the flow was in average higher during the time $T_2$ than $T_1$, but the area $A_1$ is the same as the area $A_2$. This is proven by Faraday's law of electrolysis.

Figure 9 shows another application of our integrator. We assume that an instrument measures a certain quantity and puts out a D. C. voltage proportional to said quantity. This may be the amplified output from a thermocouple, an electrical bridge arrangement, a speedometer or anything. If the voltage is not D. C. but A. C., we rectify the voltage and introduce it to our instrument over the points 93 and 94, polarized plus at 93 and minus at 94.

We will assume that the voltage is weak and does not pass enough power to energize a relay. The electrolysis current passes from 93 over resistor 95 to the anode 47, cathode 48 and by line 96 back to 94 which is the negative side of the input. By means of the lines 97 and 98 and the resistor 95, a negative bias will be placed on the grid 99 of the triode 100 relative to the cathode 48 which will prevent any current flow in the anode 101 cathode path of the tube.

When the electrolysis current is broken, however, by the action of the integrator, the voltage drop across 95 will disappear. The grid 99 will get the same potential as the cathode 102. This will allow a current to pass from one side 103 of our supply through the counter winding 104, relay coil 105, plate 101, cathode 102 and conductor 106 back to the other side 107 of the supply.

The counter 108 will register one unit, the relay is energized and a current passes from one side of the filament supply 109, relay contacts 110 and 111, filaments 49 and 50 and back to the other side 112 of the filament winding. The gases explode, restart the cycle. A graph of the integration may be exactly as previously explained in connection with Figure 10.

It will be apparent from the foregoing that the gist of this invention is:

1. Passing an electric current through an electrolyte thereby obtaining gases.
2. These gases are trapped in a container and create a gas pressure.
3. This gas pressure is utilized to do a certain amount of work as:
    a. Change the liquid level so that one of the electrodes is out of the electrolyte to create conditions for other electrical means to come into play, for example the relay in Figures 1, 2 and 6.
    b. Move the liquid and thereby make a new contact, see 19 and 20, Figure 5. Mercury is used but is not absolutely necessary.
    c. Inflate a bellows or other elastic bag, which is used directly to make or break a contact or both make and break a contact, see Figs. 7, 8 and 9.
4. When the gas pressure has created the new electrical conditions, these can be utilized to:
    a. Perform what we want done at the end of the cycle and signal that the cycle has been completed, see the lamp 66, Figure 4. Instead of the lamp any other controls too numerous to mention could be performed by the same contacts or parallel ones. The signal shows that the apparatus is ready for recycling by using the momentary switch 68 for the filaments, or filament.
    b. Perform what is to be done at the end of the cycle and light the filaments. This would happen if the contacts of switch 68 had been mounted on the relay, and energized by the same.
5. When the gas explodes it is reconverted into its original electrolyte and we have returned to the starting condition.

It has been found that direct sunlight and other strong light has a tendency to slow down the condensation of water vapor. The result of this is that after a number of cycles it may take a second or two from the lighting of the filament to the explosion of the gas. The apparatus should therefore preferably be mounted in a box or container where it is protected from direct sunrays.

In Figures 1 to 4, the instrument has been arranged with contacts and is adapted to be plugged into a standard radio tube socket. This has been found to be a practical arrangement.

When the instrument is used as a timer, we must assume it is to be connected to a constant voltage source or derives its current from a constant current source. The sample diagram of Fig. 4 shows the apparatus deriving its power from an ordinary 60 cycle A. C. line. By means of the tap switch 56 and the potentiometer 61 used as a rheostat for the electrolysis current the latter can be infinitely varied within its limits. The timing can therefore be accurately set and will accurately repeat. If the current source is 115 volts A. C. and varies between 110 volts and 120 volts, i. e., plus or minus 5 volts, the timing will be accurate better than plus or minus 5%. A thermal type relay where the timing is inversely proportional to the square of the voltage would give an error of plus or minus 10% for the same fluctuations, but generally is even much worse due to temperature build up and is often plus or minus 50%.

If higher accuracy is desired we can use either
a. Utilize a more accurate supply voltage, or
b. The resistor 71 in Figure 4 may be a compensating resistor which will counteract voltage fluctuations. This is most readily obtainable by using an ordinary light bulb which has a very steep current characteristic, as to resistance.

If we desire to consider the errors inherent in the instrument, we find only what can be caused by room temperature. This error is inherent in all types of accurate instruments. Where extreme accuracy is required or where extreme temperatures must be met, or both, compensation must be made.

If we assume that the volume of the gas chamber increases with an increase in temperature, we need more of a product, current times time to fill up the volume. To compensate for this, we can use the resistor 71 of a temperature coefficient and value which will increase the current correspondingly and thereby retain the time T substantially the same as for some other temperature.

During the research on this instrument, many types of electrolyte were found to give satisfactory results. A weak solution of sulfuric acid was found to have better overall characteristics. Used with D. C., the hydrogen is developed at the cathode and oxygen at the anode and the gas trapped is two parts hydrogen and one part oxygen. If we use hydrochloric acid we obtain hydrogen and chlorine which recombines to form hydrochloric acid. A number of bases can also be used. NaOH has given excellent results.

We have found that we can dispense with the filaments or heaters if desired. Referring to Figures 2 and 6, we have found that if we use a high supply voltage for the electrolytic current in series with a resistor of several thousand ohms and after the liquid level drops below the top electrode, we will get a current along the film of electrolyte along the glass. This current path is of such high resistance that the gas mixture will heat up sufficient to explode. This action is not at present as reliable as the filaments and depends more on the electrolyte, and is better the higher the resistance the electrolyte has and the manner it wets the glass and electrodes.

In selecting the electrolyte, it is important that we have a combination where the electrodes will not be attacked. Platinum electrodes have given excellent results, and only the small part directly in contact with the electrolyte needs to be made of this material.

The system will work using D. C. or A. C. Using A. C., however, both hydrogen and oxygen are developed at the same electrode. This reduces the efficiency due to the oxygen developing a small film of platinum oxid which acts as an electrolytic condenser.

We have obtained the most reliable operation with D. C. or rectified A. C. as shown in Figure 4.

In our research up to the present time where continuous recycling is employed, the embodiment in Figure 5 has not been as reliable as the other embodiments herein disclosed.

Insofar as we are aware we are the first in the art to integrate and time in the manner herein set forth, and we therefore desire our claims to such features to receive the broad and generic interpretation to which pioneers in the art are entitled.

Having thus described our invention, what we claim as new and desire to secure by Letters Patent is:

1. In an electrolytic timer, a receptacle containing an electrolyte and having a gas trapping chamber in free communication at its lower end with said electrolyte, the upper end of said chamber being closed except for a restricted passage opening therefrom, electrical means to decompose said electrolyte, and means to ignite the gases of decomposition and explode them when their product of volume and pressure reaches a predetermined amount, and said passage being closed under normal pressure in said chamber but opening for higher pressures created by the explosion of said gases of decomposition.

2. In an electrolytic integrator, a receptacle containing an electrolyte and having a gas trapping chamber in free communication at its lower end with said electrolyte, the upper end of said chamber being closed except for a restricted passage opening therefrom, electrical means to decompose said electrolyte, and means to ignite the gases of decomposition when their product of volume and pressure reaches a predetermined amount, and said passage being closed under normal pressures in said chamber but opening for higher pressures created by the explosion of the gases of decomposition.

3. In an electrolytic timer, a receptacle containing an electrolyte and having a gas trapping chamber in free communication at its lower end with said electrolyte, the upper end of said chamber being closed except for a restricted passage open to said receptacle, electrical means to decompose said electrolyte, and means to ignite the gases of decomposition and explode them when their product of volume and pressure reaches a predetermined amount, and said passage being closed under normal pressure in said chamber but opening for higher pressures created by the explosion of said gases of decomposition.

4. In an electrolytic integrator, a receptacle containing an electrolyte and having a gas trapping chamber in communication at its lower end with the electrolyte, the upper end of said chamber being closed except for a restricted passage opening therefrom, and an electric circuit having electrodes extending into the receptacle to decompose the electrolyte into explosive gases, thereby changing the level of said electrolyte and the resistance in said circuit, and means to ignite said gases, the time of ignition of said gases being controlled by said change in resistance.

5. In an electrolytic timer, a receptacle containing an electrolyte, electrodes and their circuit to decompose said electrolyte, said electrodes extending into the receptacle in spaced relationship, means to ignite the gases of decomposition, and means to utilize change in apparent resistance between said electrodes to control said igniting means.

6. The construction specified in claim 5 having auxiliary means to ignite gases exterior of said chamber which may not have been ignited by said first igniting means.

7. In an electrolytic device for integrating a product of electric current and time, a receptacle containing an electrolyte and having a gas trapping chamber in free communication with said electrolyte and having a restricted passage opening from said chamber, an electrical circuit to decompose the electrolyte and having electrodes extending into said receptacle, ignition means to ignite the gases of decomposition, and an ignition control circuit having a thermionic valve and means to utilize the change in current or voltage between said electrodes to vary the grid voltage in said valve to change its plate-cathode current to effect control of ignition.

8. In an electrolytic integrator, a receptacle containing an electrolyte and having a gas trapping chamber in free communication with said electrolyte, the upper end of said chamber being closed except for a restricted passage open to said receptacle, means to use a current to be integrated to decompose said electrolyte, and means to ignite and explode the gases of decomposition when they reach a predetermined amount, said passage being closed under normal pressure in said chamber but opening under explosive pressure for escape of unignited gases.

9. The construction specified in claim 8, having in addition means to ignite the unignited gases which escaped through said passage.

10. In a device of the character stated, a receptacle having two gas trapping chambers connected by a restricted passage, the first of said chambers containing an electrolyte, means to decompose said electrolyte into its gases of decomposition, means to ignite and explode said gases in said first chamber when they reach a predetermined amount, thereby opening said passage by explosive pressure to permit unignited gases to pass into said second chamber, said passage being closed under normal pressure in said first chamber, and means to ignite gases in said second chamber.

GEORGE E. FREDERICKS.
JENS SIVERTSEN.